United States Patent Office 3,171,822
Patented Mar. 2, 1965

3,171,822
COATING COMPOSITION CONTAINING VINYL CHLORIDE POLYMER AND METHOD OF MAKING SAME
David Pelton Moore, Marlow, N.H.
(9210 Flower Ave., Silver Spring, Md.)
No Drawing. Filed Jan. 24, 1964, Ser. No. 339,876
6 Claims. (Cl. 260—4)

The present invention relates to improvements in paint and methods of making same.

One object of the invention is the provision of a coating in which a combination of aqueous chemical ingredients forms a tough non-slippable, flexible transparent coating, which when applied by spraying, brushing or rolling dries in a very few minutes.

Another object of the invention is a method of intimately mixing or intermixing the several ingredients thereof, so that the same when in sealed containers will remain liquid for application at a later date, and in which the ingredients by this method are so intimately mixed as to be rendered impossible to separate one from the other.

It has been found that a combined mixture in solution of sodium bisulphite and sodium perborate, as set forth in my Patent No. 2,341,055 is preferred as an additive to a vinyl chloride copolymer, the same have the effect of giving the coating when spread and dried a toughness without brittleness. In using this combination, the sodium bisulphite is dissolved separately from the sodium perborate, so that the two solutions can be combined, as in the patent aforesaid, although, if the two solutions before combining are admitted in two streams simultaneously, a very good coating results, but not as good as when they are combined and then mixed with the copolymer.

There are several formulations, from which a desired object of this invention are obtainable, so that several of them are herein set forth, to wit:

*Example No. 1*

|  | Parts by weight |
|---|---|
| An aqueous solution of a vinyl chloride copolymer | 100 |
| A thickener | 6 |
| A combined coagulant and retarder of coagulation | 10 |

*Example No. 2*

Geon 576, an aqueous dispersion of vinyl chloride copolymer, with the monomers vinyl sulphide and vinyl sulfone _____ 100 with the same thickener and coagulant and retarder of coagulation as in Example No. 1.

*Example No. 3*

Another very satisfactory coating is composed of Geon 576, combined with 40% to 25% by volume of a rubber compound, selected from one of those set forth in U.S. Patent 2,341,055. In this instance, the vinyl chloride copolymer coating has added to it the rubber compound or mixture of the said patent, both the copolymer and the latex or rubber compound carrying the combined solution of sodium bisulphite and sodium perborate, as set forth in the patent, with from 60% to 75% of the copolymer to from 40% to 25% by volume of the rubber compound.

This combination is excellent for indoor and outdoor coating or painting, on masonry, concrete, cinder block, and non-resinous woods for outside in all climates, or for indoor off white or sand plaster walls, non-resinous wood, wall paper, and over-bleached oil painted surfaces.

All of these coatings are capable of being brushed and rolled on the surfaces, as well as being sprayed on such surfaces, and will provide lasting coatings for the surfaces set forth.

*Example No. 4*

To the vinyl coating of each example, above set forth, an air vulcanizable flowable aqueous dispersion of rubber or natural latex, using the rubber compound as set forth in Patent No. 2,341,055, and the solid rubber content should vary from 5 to 20% in the mixture. That is the vinyl mixture and the rubber compound are mixed separately and then combined.

This vinyl-latex paint has been tested for coatings on outside wood and masonry, and has withstood frost, freezing and direct sun heat without deteriorating or blistering, and also it is a desirable coating for inside walls, of plaster, concrete, and over wallpaper.

It is waterproof and can be water and soap washed, and shows no blemishes due to the expansion and contraction of the covered surface.

It is essential that the two solutions, one the coagulating solution carrying sodium bisulphite, and the other a retarder of coagulation, preferably sodium perborate, be combined into one solution, and then mixed with the vinyl chloride copolymer of Examples 1 and 2, and the latex of Examples 3 and 4.

The rubber compound as set forth in Letters Patent No. 2,341,055, and wherein the sodium bisulphite and sodium perborate solution is used with the latex, was prepared as follows: 280 grains of the perborate was dissolved in a pint of water, and 260 grains of the bisulphite was dissolved in a half pint of water. When thoroughly dissolved in both instances, the two solutions were combined, and one pint of this added in ½ gallon of 60–40% natural rubber latex. One and one-half quarts of this latex compound was added to any one of the vinyl chloride copolymers of the examples, using one gallon of the latter, to give a coating that will withstand frost and freezing, an outside coating on brick, cement, metal and wood, as well as a washable inside wall coating, and when clear, as a linoleum coating as a wax, where it can be applied by spray or mop, or brush.

The paint in the Examples 1 through 2, provide vinyl coatings that can be brushed, sprayed and rolled on inside wall and ceiling surfaces, and will not blister, while the formulation set forth in Examples 3 and 4, is a coating for both inside and outside surfaces, and on masonry, concrete, and non-resinous woods on the outside, withstands summer heat, fall and winter frosts, rains and snow, and freezing, and is waterproof in all instances of application. The surface of this paint, that is combined vinyl-latex paint, is pliable yet tough, and can be used as a protecting coating of bleached out oil painted surfaces, and all of these paints adhere exceedingly well over wall paper.

In every example, the coagulant and retarder, though each dissolved separately to make a clear liquid or solution, and in the proportions recited in the aforementioned patent, must be mixed or combined into a single solution, and then added to the vinyl chloride copolymer, and in Examples 3 and 4, this same formulation of the two solutions, preferably sodium bisulphite and sodium perborate, is mixed into the aqueous dispersion of natural rubber, or latex, simultaneously, and then the latex combination, or flowable is ready to be mixed to make a vinyl-latex paint for all purposes.

In making or mixing these several formulations, the thickener (toughener) is first thinned by mixing with a small portion of the vinyl chloride copolymer used, and then when this is in a thickened yet soluble form, it is thoroughly intermixed with the remainder of the copolymer. Then the combined aqueous dispersion of the coagulant and the retarder of coagulation is now thoroughly stirred therein, and the coating is now ready to be packaged or used, by spraying, brushing or rolling.

The proportions of the several ingredients may vary, such as for instance, the vinyl chloride copolymer may vary from 90 to 100 parts by weight, the amount of the toughener, such as an aqueous solution of sodium polyacrylate known as alcogum and/or acrysol from 4 to 15 parts by weight, and the combined coagulant and retarder of coagulation, 8 to 15 parts by weight, that is this latter being composed of sodium bisulphite and sodium perborate as set forth in the patent aforesaid.

The Geon 576, according to its manufacturer, contains 35 parts by weight of di-octyl phthalate per 100 parts of the vinyl chloride polymer, in which the vinyl chloride predominates and has been copolymerized with lesser, but modifying, ratios of one of a variety of monomers as sodium sulphide and sodium sulphone.

The Alcogum and Acrysol, each is a water solution of sodium polyacrylate of about 13% concentrate.

It is necessary that the coagulant and retarder of coagulation be made into one solution, even though two streams of each may be added simultaneously to the copolymer, for as before stated the addition of sodium perborate alone, or a solution of sodium bisulphite alone, will not, and does not, produce a similar and desirable vinyl chloride copolymer coating material.

This combined solution gives to the final dried coating a toughening not obtainable with either one alone, and also permits, or assists in the pliability of the coating, as when used to coat cloth or leather.

It has been found that this coating, when sprayed, brushed or rolled on outside masonry, concrete, non-oiled painted wood, non-resinous woods, and metals, such as aluminum and even galvanized steel, will withstand freezing temperatures, rain and snow, for several seasons, and that it can be used to coat old oil painted surfaces, inside or outside surfaces.

This coating material will take white lead powder and/or titanium oxides, to produce a white surface, and which then can be made into battleship grey by adding carbon black. For other colors, any alkali coloring, either with the straight coating material, or with the whites, can be made into many shades, as may be elected or desired. As an art paint, the artist can coat paper, canvas, metal and glass, and when the plain colored coating is employed on glass it is like a colored transparency, and when alone, it is imperceptible as it is as clear as glass.

Sodium chloride when added to the combined sodium perborate and sodium bisulphite solution, that is, one ounce to eight ounces of water, adds to the coating material when spread and dry, greater toughness, without lessening the transparency and pliability.

The monomers or comonomers preferably employed with the vinyl chloride copolymers of the above-noted examples, are vinyl sulfide, singly or combined with vinyl sulfone.

What is claimed is:
1. A method of making a coating composition comprising intimately mixing together:
   (a) about 90 to 100 parts by weight of a copolymer of vinyl chloride and at least one comonomer selected from the group consisting of vinyl sulfide and vinyl sulfone;
   (b) about 8 to 15 parts by weight of a combined aqueous solution containing sodium perborate and sodium bisulphite; and
   (c) about 4 to 15 parts by weight of an aqueous dispersion of sodium polyacrylate, said composition producing when spread a coating that is tough, pliable and transparent.
2. A coating composition prepared in accordance with the method of claim 1.
3. The method of claim 1 in which an aqueous dispersion of a rubber is added.
4. A method of making a coating composition comprising intimately mixing together:
   (a) about 100 parts by weight of a copolymer of vinyl chloride and at least one comonomer selected from the group consisting of vinyl sulfide and vinyl sulfone;
   (b) about 10 parts by weight of a combined aqueous solution containing sodium perborate and sodium bisulphite; and
   (c) about 6 parts by weight of an aqueous dispersion of sodium polyacrylate of about 13% concentration, said composition producing when spread a coating that is tough, pliable and transparent.
5. The method of claim 4 in which an aqueous dispersion of a rubber latex is added.
6. A coating composition prepared in accordance with the method of claim 5.

References Cited by the Examiner
UNITED STATES PATENTS

| | | | |
|---|---|---|---|
| 2,341,055 | 2/44 | Moore | 260—815 |
| 2,683,698 | 7/54 | Bates | 260—29.6 |

FOREIGN PATENTS

| | | |
|---|---|---|
| 734,392 | 7/55 | Great Britain. |

MURRAY TILLMAN, *Primary Examiner.*

WILLIAM H. SHORT, *Examiner.*